(12) United States Patent
Blijdenstein et al.

(10) Patent No.: US 8,597,708 B2
(45) Date of Patent: *Dec. 3, 2013

(54) FOOD COMPOSITION COMPRISING GAS BUBBLES AND PROCESS FOR PREPARING IT

(75) Inventors: Theodorus Berend Jan Blijdenstein, Vlaardingen (NL); Jian Cao, Shanghai (CN); Petrus Wilhelmus N de Groot, Vlaardingen (NL); Weichang Liu, Shanghai (CN); Simeon Dobrev Stoyanov, Vlaardingen (NL); Weizheng Zhou, Shanghai (CN)

(73) Assignee: Conopco, Inc., Englewood Cliffs, NJ (US)

( * ) Notice: Subject to any disclaimer, the term of this patent is extended or adjusted under 35 U.S.C. 154(b) by 90 days.

This patent is subject to a terminal disclaimer.

(21) Appl. No.: 12/445,583

(22) PCT Filed: Oct. 3, 2007

(86) PCT No.: PCT/EP2007/060517
§ 371 (c)(1), (2), (4) Date: Apr. 15, 2009

(87) PCT Pub. No.: WO2008/046742
PCT Pub. Date: Apr. 24, 2008

(65) Prior Publication Data
US 2010/0189867 A1    Jul. 29, 2010

(30) Foreign Application Priority Data

Oct. 17, 2006  (EP) .................................. 06122405
Jun. 19, 2007  (EP) .................................. 07110538

(51) Int. Cl.
A23C 13/12    (2006.01)
A23D 7/00     (2006.01)

(52) U.S. Cl.
USPC ........................... 426/564; 426/602; 426/603

(58) Field of Classification Search
CPC ....................................................... A23D 7/00
USPC ........................................................ 426/564
See application file for complete search history.

(56) References Cited

U.S. PATENT DOCUMENTS 3,809,764 A    5/1974    Gabby et al.
3,968,266 A    7/1976    Baugher
(Continued)

FOREIGN PATENT DOCUMENTS

DE    19617568        12/1997
EP    0238330 A2      9/1987
(Continued)

OTHER PUBLICATIONS

International Search Report International Application No. PCT/EP2007/060517 mailed Feb. 29, 2008.
(Continued)

Primary Examiner — Larry Tarazano
Assistant Examiner — Philip Dubois
(74) Attorney, Agent, or Firm — Michael P. Aronson (57) ABSTRACT

A food composition comprising gas bubbles is provided. It contains based on the food composition at least 10 wt. % of water, optionally fat, wherein the amount of fat and water taken together is at least 60 wt. % and less than 99 wt. %, at least 1 vol. % and less than 70 vol. % of gas, fiber particles and surface active particles. The volume weighted mean diameter of the surface active particles (d2) is smaller than the length of the fiber particles (L). Also a process is provided to prepare the product. The process includes the steps of incorporating surface active particles and fiber particles in a liquid food composition, incorporating gas in said liquid composition and packing the food composition.

2 Claims, 1 Drawing Sheet

Detailed SEM microscopic image showing adsorbed surface active particles and attached fibres.

(56) References Cited

U.S. PATENT DOCUMENTS

| | | | |
|---|---|---|---|
| 4,154,863 | A | 5/1979 | Eapen et al. |
| 4,612,852 | A | 9/1986 | Price et al. |
| 4,631,196 | A | 12/1986 | Zeller |
| 4,770,892 | A | 9/1988 | Grealy et al. |
| 4,793,279 | A | 12/1988 | Grenier |
| 4,828,854 | A | 5/1989 | Beer |
| 5,000,974 | A | 3/1991 | Albersmann |
| 5,004,623 | A | 4/1991 | Giddey et al. |
| 5,395,877 | A | 3/1995 | Pucknat et al. |
| 5,493,957 | A | 2/1996 | Kennedy et al. |
| 5,605,712 | A | 2/1997 | Bertrand et al. |
| 5,789,004 | A | 8/1998 | Hogan et al. |
| 5,800,604 | A | 9/1998 | Berger |
| 6,177,103 | B1 | 1/2001 | Pace et al. |
| 6,241,812 | B1 | 6/2001 | Smith et al. |
| 6,262,128 | B1 * | 7/2001 | Stern et al. ............... 516/10 |
| 6,326,046 | B1 | 12/2001 | Tucker et al. |
| 6,497,913 | B1 * | 12/2002 | Gray et al. ............... 426/565 |
| 6,677,318 | B1 | 1/2004 | Beisel |
| 2003/0078172 | A1 | 4/2003 | Guiramand et al. |
| 2003/0175317 | A1 | 9/2003 | Barthel et al. |
| 2004/0185162 | A1 | 9/2004 | Finnigan et al. |
| 2005/0137115 | A1 | 6/2005 | Cole et al. |
| 2005/0222082 | A1 | 10/2005 | Beisel |
| 2006/0063882 | A1 | 3/2006 | Velev et al. |
| 2007/0071874 | A1 * | 3/2007 | Cash et al. ............... 426/601 |

FOREIGN PATENT DOCUMENTS

| | | | |
|---|---|---|---|
| EP | 0292034 | | 11/1988 |
| EP | 0348503 | B1 | 1/1990 |
| EP | 0348503 | * | 5/1995 .............. A23G 9/00 |
| EP | 0 930 017 | | 7/1999 |
| EP | 1079021 | A1 | 2/2001 |
| EP | 1166655 | A1 | 1/2002 |
| EP | 1295594 | A1 | 3/2003 |
| EP | 1582105 | A1 | 10/2005 |
| GB | 2 377 155 | | 1/2003 |
| JP | 60099333 | | 6/1985 |
| JP | 2002161161 | | 6/2002 |
| KR | 950006071 | | 6/1995 |
| WO | WO 01/06865 | | 2/2001 |
| WO | WO03040190 | A1 | 5/2003 |
| WO | WO2004017746 | A1 | 3/2004 |
| WO | WO2005082507 | A1 | 9/2005 |
| WO | WO 2006/007393 | | 1/2006 |
| WO | WO2006007393 | A1 | 1/2006 |
| WO | WO2006067064 | A1 | 6/2006 |
| WO | WO 2007/068344 | | 8/2007 |

OTHER PUBLICATIONS

Alargova et al., "Foam Superstabilization by Polymer Microrods", Langmuir 2004, 20, pp. 10371-10374.
Co-pending application Blijdenstein et al., U.S. Appl. No. 12/445,582, filing date TBA.
Co-pending application Blijdenstein et al., U.S. Appl. No. 12/445,579, filing date TBA.
Co-pending application Berry et al., U.S. Appl. No. 12/445,592, filed Apr. 15, 2009.
Co-pending application Cai et al., U.S. Appl. No. 12/088,095, filed Jun. 5, 2008.
National Starch, Dry-Flo, Technical Service Bulletin, Food Innovation.
Mar. 9, 2004, Dry-Flo Trademark, Trademark Electronic Search System TESS, First Use in Commerce 19500101.
Sep. 28, 2001, Cellulose Processing, Executive Summary 2001 pp. 1-17, NOSB TAP Review.
Alargova et al., 2006, Formation of Polymer Microrods in Shear Flow by Emulsification-Solvent Attrition Mechanism, Langmuir, 22, 765-774.
Alargova et al, Sep. 1, 2004, Scalable Synthesis of a New Class of Polymer Microrods by a Liquid-Liquid Dispersion Technique, Advanced Materials, 2004, vol. 16, No. 18, pp. 1653-1657.
Antova et al., Studies upon the synthesis of cellulose stearate under microwave heating, Carbohydrate Polymers, 2004, 57, pp. 131-134.
Arbuckle, 1972, Ice Cream, Ice Cream 2nd Ed 1972 pp. 35 266 284-285.
Binks, 2002, Particles as surfactants-similarities and differences, Current Opinion in Colloid and Interface Science, 7, 21-41, Elsevier.
Combes et al., Feb. 1, 2000, Supercritical Fluid Processes, H1839 2000 pp. 1-5.
Iijima et al., 2000, Microcrystalline cellulose: an overview, Handbook of Hydrocolloids, 2000 Ch 19, pp. 1-16.
Lewis, 2007, Carboxymethylcellulose, Hawley's Condensed Chemical Dictionary, 15th Ed, 2007, p. 238, John Wiley & Sons.
Noble et al., Apr. 16, 2004, Fabrication of "Hairy" Colloidosomes with Shells of Polymeric Microrods, Journal of the American Chemical Society, 126, pp. 8092-8093.
Paunov, 2003, Novel Method for Determining the 3 Phase Contact Angle of Colloid Particles Adsorbed at Air-Water and Oil-Water Interfaces, Langmuir, 19 pp. 7970-7976.
Ramsden, Separation of Solids in the Surface-layers of Solutions and Suspensions, Physiologische Abtheilnug, 1903, pp. 156-164.
Rolls, 2000, Increasing the volume of a food by incorporating air effects satiety in men, Am. J. Clin. Nutr., 72, pp. 361-368, American Society for Clinical Nutrition.
Rousseau et al., Stabilization of water-in-oil emulsions with continuous phase crystals, Colloids and Surfaces, A Physicochem Eng Aspects, 2005, vol. 260, pp. 229-237, Elsevier B.V.
Wansink, Bottomless Bowls: Why Visual Cues of Portion Size May Influence Intake, Obesity Research, 2005, vol. 13, No. 1, p. 93, Obesity Research.
Watson, et al., The Effect of Solvent and Fiber Treatment on the Depositin of Organic Silane Solutions Using THF and Acetone, Journal of Colloid and Interface Science, 2001, 241, pp. 32-44.
Whitesides et al., Self-Assembly at All Scales, Science Mar. 29, 2002, vol. 295, pp. 2418-2421.
Wu, et al., 2003, SU-8 Hydrophilic Modification by Forming Copolymer with Hydrophilic Epoxy Molecule, 7th Intl Conference on Miniaturized Chemical & Biochemical Analysis Sys, 2003, pp. 1117-1120.
Aqualon CMC brochure, pp. 2 and 11.
Aqualon Hydroxypropylcellulose brochure, pp. 2 and 7.
Co-pending application Cox et al., U.S. Appl. No. 12/445,478, filed Apr. 14, 2009.

* cited by examiner

Figure 1:
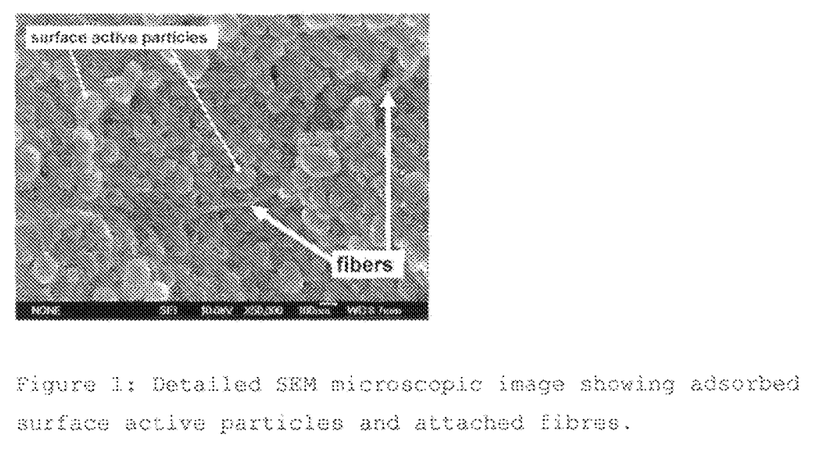

Figure 1: Detailed SEM microscopic image showing adsorbed surface active particles and attached fibres.

Figure 2:
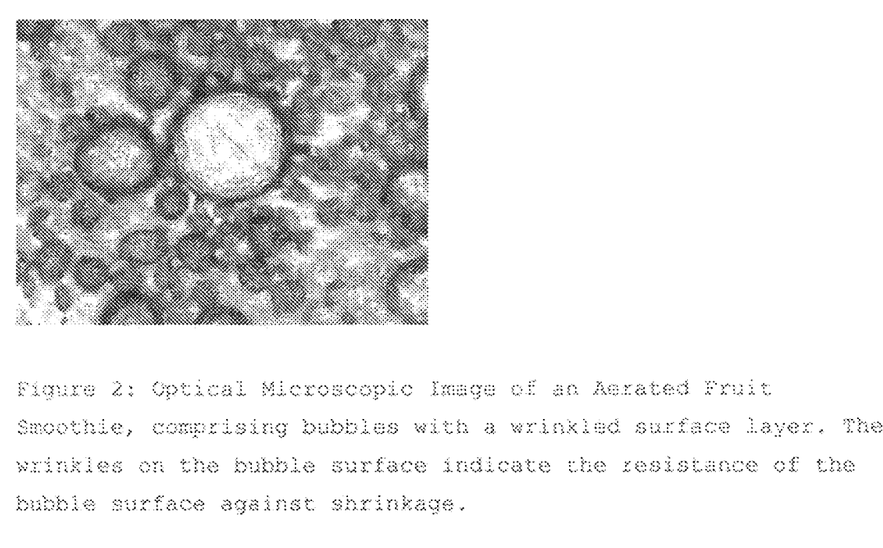

Figure 2: Optical Microscopic Image of an Aerated Fruit Smoothie, comprising bubbles with a wrinkled surface layer. The wrinkles on the bubble surface indicate the resistance of the bubble surface against shrinkage.

FOOD COMPOSITION COMPRISING GAS BUBBLES AND PROCESS FOR PREPARING IT

FIELD OF THE INVENTION

The invention relates to a food composition comprising gas bubbles and a process for preparing it.

BACKGROUND OF THE INVENTION

In many food products, incorporated air is used to increase the volume of the food product. Thus, gas can be used as an inert filler and reduce the amount of calories and components like e.g. saturated fat, salt and sugar in a given volume of product. Examples of foamed food products are e.g. whipped cream, bavarois, herb butter, some fresh cheese products, ice cream, chocolate with air bubbles, cappuccino. Next to volume increase, the airy texture may provide a foamy, creamy and/or light mouth feel to the consumer, which is desired for many products. The presence of gas bubbles in a product may also give it an appealing appearance. Especially in new style cooking, sauces, dressings and butters but also soups, purees etc. may be foamed, representing a new dimension of cooking and food products with increasing relevance.

When producing food products comprising gas bubbles, a main challenge to meet is that gas bubbles are not stable in time. Stabilisation in conventional food products is provided by e.g. fat crystals (whipped cream, herb butter, aerated fat spread) or by protein (cappuccino, bavarois) possibly in combination with gelling agent. A problem with a fat-based stabilisation mechanism is that it is considered to be unhealthy, as fat types are required which melt at higher temperatures, such as saturated, hard, fats. Such fat may have adverse effect on blood cholesterol level. Fats also have a high caloric content. A problem with the protein-based stabilisation mechanisms is that they are applicable only for a limited range of products. Such foams may also loose their stability quickly, e.g. whipped egg white. Both stabilisation mechanisms fail, at least to certain extent, when applied at higher temperatures, and may tend to lose their stabilising effect when heated or even when stored outside a chilled area.

Therefore, it is an aim of the present invention to provide a food composition comprising gas bubbles, wherein the stabilisation mechanism of the gas bubbles is low in caloric value and applicable for a broad range of food compositions. It is also an aim for the food composition to have relatively good stability against disproportionation. Disproportionation is the growth of large gas bubbles at the expense of small ones, resulting in an increase of average bubble size. The food composition comprising gas bubbles should be stable for at least some hours or preferably some days at room temperature. Preferably, the food composition comprising gas bubbles is stable for at least several hours at higher temperature (higher than 20° C.) and survives the supply chain from the factory to the consumer without significant trouble. Preferably, the food composition has a pleasant mouth feel. Preferably, the stabilisation mechanism can be prepared from conventional and relatively cheap materials.

SUMMARY OF THE INVENTION

Accordingly, to meet, at least partly, the aims mentioned above, in a first aspect the present invention provides a food composition comprising gas bubbles and, based on the food composition,
- at least 10 wt. % of water,
- optionally fat, wherein the amount of fat and water taken together is at least 60 wt. % and less than 99 wt. %,
- at least 1 vol. % and less than 70 vol. % of gas,
- fibre particles,
- surface active particles,
wherein the volume weighted mean diameter of the surface active particles (d2) is smaller than the length of the fibre particles (L).

In a second aspect, the invention provides a process to prepare a food composition according to the invention, the food composition comprising gas bubbles and, based on the food composition,
- at least 10 wt. % of water,
- optionally fat, wherein the amount of fat and water taken together is at least 60 wt. % and less than 99 wt. %,
- at least 1 vol. % and less than 70 vol. % of gas,
- fibre particles
- surface active particles,
wherein the volume weighted mean diameter of the surface active particles (d2) is smaller than the length of the fibre particles (L),
the process comprising the steps of:
a. incorporating in a liquid food composition
   surface active particles
   fibre particles
b. incorporating gas in said liquid food composition
c. packing the food composition.

DETAILED DESCRIPTION OF THE INVENTION

The present invention relates to a food composition. In the present context, it is intended that "food composition" comprises both solid food compositions and liquid, e.g. drinkable, food compositions.

The present invention relates to food compositions that contain at least some moisture. As mentioned in the summary of the invention, a minimum amount of water is desired of at least 10 wt. %, based on the weight of the food composition. Preferably, the amount of water is at least 20 wt. %, more preferably at least 40 wt. % and less than 99 wt. %, preferably less than 95 wt. %, based on the weight of the food composition.

The food composition according to the present invention does not need to comprise fat but it may do so. The expression fat encompasses both fat that is solid at room temperature as well as liquid oil. Fat that is solid at room temperature such as butterfat and margarine fat often comprises only a relatively small amount of fat crystals while the balance of the fat is in the liquid state. The present invention is especially beneficial for food compositions that contain relatively little fat crystals or no fat crystals at all.

The fat in the food composition, if present, preferably consists of vegetable fat, milk fat, fish oil or a combination of two or more thereof. The vegetable fat may include palm oil, palm kernel oil, coconut oil and fractions thereof and combinations of two or more thereof. Preferably the vegetable fat is liquid oil. Preferably the vegetable fat comprises olive oil, sunflower oil, safflower oil, soybean oil, rapeseed oil, corn oil, groundnut oil, cottonseed oil or a combination of two or more thereof. According to the invention, the total amount of water and fat taken together is at least 60 wt. % and less than 99 wt. % based on the weight of the food composition. If the food composition does not contain fat then the water content of the food composition should be at least 60 wt %.

For optimal organoleptic properties it is often advantageous for the food composition to contain at least some fat. Accordingly, the food composition preferably comprises at least 0.3 wt % fat, more preferably at least 0.5 wt % fat, especially at least 1 wt % fat. The fat content preferably does not exceed 85 wt %.

Even though the portion of liquid material in the present products is relatively high, namely at least the water and typically most, if not all of the fat, we have found that with the combined presence of the fibre particles and the surface active particles stable aerated food products can be obtained. The presence of the gas bubbles allows the formulation of products with good mouth feel that are relatively light and can impart a creamy impression. The particles that stabilize the aerated structure themselves are relatively low in calories and the incorporation of the gas further assists in obtaining products with a relatively low caloric density while the sensoric impression can resemble those of more rich products.

Furthermore, the present invention allows the development of novel food textures, e.g. foamed soups and sauces that have hitherto only been available as artisanal products freshly prepared by a chef. With the present invention such products can have sufficient stability to prepare them in industrial premises and then ship them e.g. to a retail outlet. The combined amount of water and fat in the present food composition is preferably at least 70 wt %, more preferably at least 75 wt % and preferably less than 97 wt %, more preferably less than 95 wt %. For these products also the presence of fat is optional, i.e. the combined amount of water and fat may consist of only water. Nevertheless, as explained above, the presence of at least some fat is preferred.

The present invention requires the presence of gas bubbles in the food composition, in an amount of at least 1 vol. % and less than 70 vol. %. The gas suitably is air, but nitrogen or a gas comprising air and or nitrogen is also preferred. Other gasses that may be used in stead of or in combination with air and/or nitrogen are e.g. carbon dioxide, nitrous oxide and oxygen. However, preferably the gas in the food composition is air, nitrogen or a combination thereof.

In a preferred aspect, the invention relates to a food composition wherein the gas bubbles have a volume weighted mean diameter of less than 1000 µm. Preferably the gas bubbles have a minimum volume weighted mean diameter of at least 10 µm. The presence of gas bubbles with a diameter outside the preferred scope of the preferred diameter may however occur without leaving the scope of the invention. The amount of gas in the food composition is preferably at least 5 vol %, more preferably at least 10 vol % and preferably less than 65 vol %, more preferably less than 60 vol %.

It can be particularly beneficial to use gas bubbles stabilized by surface active particles and fibre particles in the present product as an inert filler to reduce the amount of calories, of saturated fat, of salt, of sugar or of a combination of two or more thereof in a given volume of product. It can also be beneficial to use gas bubbles stabilized by surface active particles and fibre particles in the present product to provide creamy and/or light mouth feel to the consumer at a relatively low level of saturated fat.

The present invention requires the presence of fibre particles. By the word "fibre particle", we mean any insoluble, particulate structure, wherein the ratio between the length and the diameter ranges from 5 to infinite. "Insoluble" here means insoluble in water. Here, the diameter means the largest distance of the cross-section. Length and diameter are intended to mean the average length and diameter, as can be determined by (electron-) microscopic analysis, atomic force microscopy or light scattering.

The fibres used in the present invention have a length (L) of preferably 0.1 to 100 micrometer, more preferably from 1 to 50 micrometer. Therefore, in a preferred aspect, the invention relates to a food composition wherein the length (L) of the fibre particles is at least 0.1 µm and less than 100 µm. The diameter (d1) of the fibre particles is preferably in the range of 0.01 to 10 micrometer.

The aspect ratio (length/diameter) is preferably more than 10, more preferably more than 20 up to 1,000. Therefore, in a preferred aspect, the invention relates to a food composition, wherein the fibre particles have an aspect ratio of at least 10, and less than 1000.

The materials of the "fibre" substance can be organic, inorganic, polymeric and macromolecular. The fibre topology might be linear or branched (star-like). The aspect ratio in this case is defined as aspect ratio of the longest branch. The amount of the fibre particles in the aerated food composition is preferably between 0.001 and 10 wt. %, based on the total weight of the aerated composition, more preferably from 0.01 to 5 wt. %, especially from 0.1 to 1 wt. %. Therefore, in a preferred aspect, the invention relates to a food composition, wherein the fibre particles are present in an amount of at least 0.001 wt. % and less than 10 wt. %.

The fibre particles have to be of food-grade quality. The fibres may be of organic or inorganic origin. In particular, insoluble fibres made of carbohydrates, such as microcrystalline cellulose, can be used. One example of a suitable source is the microcrystalline cellulose (MCC) obtainable from *Acetobacter*. Other examples are citrus fibres, onion fibres, fibre particles made of wheat bran, of lignin and stearic acid fibres. Commercially available MCC is often coated with anti caking agent. For the present invention preferably pure MCC fibre particles are used. If so desired this can be prepared from commercially available MCC by removing the anti caking agent.

Examples of inorganic fibres are $CaCO_3$ and attapulgite, but other edible inorganic crystals with fibre-like morphology could also be used.

Preferably, the fibre particles are vegetable fibre particles. Therefore, in a preferred aspect, the invention relates to a food composition, wherein the fibre particles are vegetable fibre particles. In another preferred aspect, the invention relates to a food composition, wherein the fibre particles comprise cellulose fibres or microcrystalline cellulose fibres. The fibres that are used in the present invention can be used as such, but also in modified form.

It is also possible to prepare fibres from a waxy material. Examples of a suitable source for the waxy material are the food-grade waxes carnauba wax, shellac wax or bee wax. This food-grade waxy material can be transformed into micro-particulate fibres by inducing precipitation of a wax solution via solvent change under shear. For instance, the food-grade waxy material is dissolved in high concentration in ethanol and a small amount of this solution is added to a viscous liquid medium and subjected to shearing. For the influence of the various parameters that affect the formation of the waxy fibres, reference is made to WO-A-06/007393 (North Carolina State University).

The present invention further requires the presence of surface active particles. The expression "surface active" means that the particles are preferentially present at an air-water interface compared with the bulk of the water phase. This can be determined by (electron-) microscopic analysis. Preferably, the surface-active particles have a volume weighted mean diameter (d2) in the range of 0.01 to 10 µm, preferably in the range of 0.1 to 1 µm. Therefore, in a preferred aspect, the present invention relates to a food composition, wherein the volume weighted mean diameter of the surface active particles (d2) is at least 0.01 µm and less than 10 µm. In another preferred aspect, the invention relates to a food composition, wherein two times the volume weighted mean diameter (d2) of the surface active particle is smaller than the length of the fibre particles (L). More preferably, four times d2 is smaller than L.

The amount of the surface active particles in the food composition comprising gas bubbles is preferably between 0.001 and 10 wt. %, based on the total weight of the aerated composition, more preferably from 0.01 to 5 wt. %, especially from 0.1 to 1 wt. %. Therefore, in a preferred aspect, the invention relates to a food composition, wherein the surface active particles are present in an amount of at least 0.001 wt. % and less than 10 wt. %.

The surface active particles as used in the present invention are food-grade. Preferably, the surface-active particles are organic particles that are preferably made from materials selected from the group consisting of modified celluloses, modified starches and insoluble proteins. For example, modified starch granules can be used, e.g. Dry Flo PC® ex National Starch, Bridgewater, N.J., USA. As protein e.g. globular protein e.g. soy, pea and/or dairy protein can be used. Information on globular proteins is given in Food Science, Nutrition and Health 5$^{th}$ ed, Brian Fox and Allan Cameron, (1989), publisher Edward Arnold. The protein can be insolubilized to obtain discrete protein particles e.g. by heat treatment and/or treatment with acid. The protein preferably has a Protein Dispersibility Index (PDI) at 20° C. of less than about 20, more preferably less than about 10%. Generally, it is preferred to have the PDI as low as reasonably possible. PDI can be measured according to the method AOCS Ba 10-65 (99) at 20° C.

In a preferred embodiment, the surface-active particles are made from methyl or ethyl cellulose. If methyl cellulose is used, it should be ensured that it can occur as particles, i.e. that it is insoluble, e.g. by choosing a methyl cellulose with a high degree of substitution. Alternatively, the surface-active particles can be inorganic. For example, silicon dioxide or food grade clays can be used, e.g. bentonite. If so desired the surface activity of particles can be modified by chemical or physical techniques known per se, e.g. by attaching small groups, for example alkyl groups such as ethyl or methyl groups.

We believe that the beneficial properties of the present food composition, in particular the stability of the gas bubble structure even at room temperature or elevated temperature, relate to the microscopic structure of the food composition. Fibre particles are present together with surface-active particles at the air-water interface and attract each other. In such an attraction, preferably the hydrophobic and hydrophilic character of the particles may be involved. Therefore, in a preferred aspect the invention relates to a food composition, wherein the fibre particles are hydrophilic and the surface active particles are hydrophobic.

The presence of the fibres and the particles can be observed by means of microscopic techniques, preferably by means of Scanning Electron Microscopy (SEM) (see FIG. 1). The presence can also be detected by means of light microscopy, where bubbles with wrinkles at the air/water surface are observed (see FIG. 2).

The present food composition comprises amounts of fibre particles and surface active particles in a weight ratio of preferably between 1:10 and 10:1, more preferably between 1:5 and 5:1, especially between 1:3 and 3:1.

In a preferred aspect, the food composition also comprises protein. Examples of protein are vegetable protein, (e.g. soy protein, rapeseed protein, pea protein) and animal protein, (e.g. milk protein, egg white protein, fish protein, blood protein). Microbial protein may also be present. Preferred protein sources are milk protein and soy protein. Preferably, the amount of protein is from 0.1 to 20 wt. % based on the weight of the food composition. Therefore, in a preferred aspect, the invention relates to a food composition, further comprising protein, in an amount of from 0.1 to 20 wt. %, based on the food composition.

In a further aspect, the invention relates to a food composition, wherein the food composition is a structured food composition. Structured is intended to mean that the food composition has certain texture and viscosity which is substantially higher than the texture and viscosity of a watery solution. The composition may be solid, e.g. fresh cheese or mayonnaise or a plastic solid like butter or vegetable fat spread. It may also be a viscous fluid e.g. a sauce or a dressing. The structured food composition may comprise protein in a relatively low amount. Fat is preferably present in a relatively high amount; the present structured food composition requires the presence of at least a substantial amount of fat. Fat may be in the form of oil or include oil, as explained above. Therefore, in a preferred aspect, the invention relates to a structured food composition that is aearated (i.e. contains gas bubbles) and comprises protein, wherein the protein is present in an amount of at least 0.3 wt. % and less than 20 wt. %, and fat is present in an amount of at least 15 wt. %, and less than 85 wt. %, based on the weight of the food composition. Examples of structured food compositions according to the invention are dressings, spreads, fresh cheese, cottage cheese, meal sauce, table sauce, mayonnaise. In a preferred aspect, the invention therefore relates to a structured food composition, wherein the food composition is a dressing, a spread, a fresh cheese, a sauce or a mayonnaise.

In another aspect, the invention relates to a drinkable food composition. "Drinkable" in the present context includes beverages. It also includes compositions that are fluid and have relatively high water content even though they may also be consumed with a spoon, e.g. soup, pourable yogurt and the like. The fat content of the drinkable food composition according to the invention is relatively low, compared to the structured food composition, and is preferably in a range of from 0.3 to 6 wt. %, based on the weight of the drinkable food composition. However, the drinkable food composition may contain less than 0.3 wt % fat and it does not need to contain any fat at all. The amount of water in the drinkable food composition is relatively high, preferably in a range of from 75 to 99 wt. %, based on the weight of the drinkable food composition. Examples of drinkable food compositions according to the invention are e.g. a soup, a bouillon, a soft drink, a drink comprising tea solids and a drink comprising fruit and/or vegetable juice. In a preferred aspect, the invention relates to a food composition, which is a drinkable food composition and comprises less than 6 wt. % fat and at least 75 wt. % and less than 99 wt. % of water, based on the weight of the food composition. The expression "less than 6 wt % fat" encompasses no fat at all. In another preferred aspect, the invention relates to a drinkable food composition, wherein the food composition is a soup, a bouillon, a soft drink, a drink comprising at least 50 wt. % of tea or a drink comprising at least 50 wt. % of fruit and/or vegetable juice. The expression juice includes reconstituted concentrate. The juice may include fruit and/or vegetable pulp and/or other partially insoluble materials originating from fruits and/or vegetables.

A preferred drinkable food composition is a drinkable food composition based on dairy (e.g. yoghurt or milk) or soy. Especially soy drinks increase in popularity, as they may function as a replacer of dairy based drinks. The preferred dairy-based or soy-based drinkable food compositions comprise protein. To this end, the present invention relates to a drinkable food composition, further comprising protein in an amount of at least 0.3 wt. % and less than 7 wt. %, based on the weight of the drinkable food composition. Preferably they comprise at least 0.5 wt % and less than 5 wt. % protein, based on the weight of the drinkable food composition. Preferably, the protein is milk protein, such as casein and/or whey, or soy protein. For example, with the present invention products with some similarity to milkshake or cappuccino and products like aerated yogurt and cocoa-milk drinks can now be prepared in an industrial environment, while retaining the aerated nature of the product during transportation to the retail or catering outlet. Another advantage of the invention is that drinkable food compositions containing gas bubbles can be provided without having to rely on packaging that can be pressurized such as metal cans. If so desired the product can be warmed, e.g. in a microwave oven, before consuming the product.

The food compositions according to the invention may be stored at room temperature, chilled or even frozen, depending on the food product. The food composition, or more specific, the gas bubbles in the food composition, can remain stable at e.g. 10° C. or upon heating to a temperature higher than room temperature, e.g. 30 or 40° C. or even higher. Therefore, a warm or hot food composition is also within the scope of the invention. Accordingly, in a preferred aspect, the present invention relates to a food composition, wherein the food composition has a temperature of at least 3° C. up to the boiling temperature of the food composition. Preferably the temperature of the food composition is within the temperature ranges of from at least 10° C., preferably at least 20° C., more preferably at least 30° C. and less than 100° C., preferably less than 90° C., more preferably less than 80° C. Some of the substances that can be used as fibre particles (e.g. fibres made of certain waxes) or as surface active particles may melt at a temperature below the boiling temperature of the food composition. If the food composition is intended to be stored or consumed at elevated temperature, then preferably the fibre particles and the surface active particles are composed of material that does not melt to a substantial degree at such temperature.

The present invention further relates to a process to prepare a food composition according to the invention, i.e. a food composition comprising
  at least 10 wt. % of water,
  optionally fat, wherein the amount of fat and water taken together is at least 60 wt. % and less than 99 wt. %,
  at least 1 vol. % and less than 70 vol. % of gas,
  fibre particles,
  surface active particles,
wherein the volume weighted mean diameter of the surface active particles (d2) is smaller than the length of the fibre particles (L). The process has been indicated in the "summary of the invention".
The process comprises the steps of:
  a. incorporating in a liquid food composition
    surface active particles
    fibre particles
  b. incorporating gas in said liquid food composition
  c. packing the food composition.

In a first step (a) surface active particles and fibre particles are incorporated in a liquid food composition. This liquid food composition may be a liquid such as e.g. water in which the particles are dispersed. Preferably the liquid consists substantially or entirely of water.

The fibre particles and surface active particles may be incorporated after each other or simultaneously. When incorporated simultaneously, the fibre particles and surface active particles may be in a separated state, i.e. they are separated from each other and no connection or assembly is present between them initially. It is also possible to add the fibre particles and surface active particles together, in a state wherein they are already at least partly connected or assembled to each other. The difference between both ways of addition of the particles can be analysed from the resulting product using (electron-) microscopic analysis. If "pre-assembled" particles are used, the amount of fibre particles assembled with surface active particles is defined by and known to the skilled person preparing the mix of fibre particles and surface active particles. If the fibre particles and the surface active particles are added separately to the liquid food composition, preferably water, and they self-assemble due to the interaction between them, probably not all fibre particles and surface active particles assemble with each other so that one may observe (e.g. by means of microscopy) separate fibres or surface active particles in the dispersion.

In step (b) of the process of the invention gas, preferably air, is incorporated in the liquid food composition. This may be suitably done by techniques known to a person skilled in the art. This may include e.g. the application of shear to obtain a desired bubble size distribution. Step (b) may be carried out after step (a) or simultaneously therewith, but preferably it is done after step (a).

Part of the ingredients and/or material to be present in the final food composition may be incorporated before or after the incorporation of the fibre particles, the surface active particles and/or the gas or simultaneously therewith. Preferably however, first a foamed composition is made in step (a) and step (b) that consists substantially of water, fibre particles, surface active particles and gas, and then the foamed composition is combined with the other materials. These other materials may have been subjected to processing steps separately before they are combined with the foamed composition.

It is specifically preferred in the present process that any fat, protein and thickening agent to be included in the food composition, is included after step b and before step c. Materials like salt, sugar and alcohol can more easily be included earlier in the process, if so desired.

The composition resulting from step (b) or after combination with further materials to be included, may be subjected to further processing, e.g. mixing or heat treatment. However, in the present process, the application of high shear force on the composition after step (b) and after the desired gas bubbles structure has been created, is preferably avoided.

Step (c) of the process according to the invention comprises the packing of the food composition. Packing may be preferably carried out by packing in a jar, can, doypack, wrapper, carton box, or by any means suitably used by a skilled person for the packing of a specific type of product.

Unless specifically indicated otherwise, throughout this application all percentages, portions and ratios are by weight, except in relation to the amount of gas. The amount of gas is indicated by volume % expressed as the volume of gas calculated as % on the volume of the total aerated product.

The invention will be illustrated by the following examples.

Example 1

Pure microcrystalline cellulose (MCC) fibre particles were prepared as follows: 15 g of medical absorbent cotton (Shanghai Medical Instrument Co. Ltd, China) was dispersed into 150 ml of 50% (V/V) sulfuric acid in a 400 ml beaker. Subsequently the beaker was put into a water bath with the temperature of 30° C. The hydrolysis will last for 6.5 hours with continuous magnetic stirring. The resultant mixture was cooled down and diluted by 850 ml of deionised water. After 24 hours, microcrystalline cellulose (MCC) fibres would settle down to the bottom of the beaker, and the supernatant was removed and replaced by the same volume of deionised water. This purification process was repeated for 5 times. Then the MCC suspension was transferred into a dialysis tube to remove the acid and impurities completely by dialyzing in water. This procedure was repeated for several times until the pH value of the water in the MCC dispersion was neutral (pH ~6). The MCC suspension was further diluted to 4% (weight concentration) and was put into a freeze dryer. The dry MCC powders were obtained after 48 hours and the yield is about 20%.

To measure the length L of the MCC fibre particles, a sample of the MCC powder was finely dispersed in water, centrifuged and separate fractions were dried and assessed with Scanning Electron Microscopy. The length L of the fibres of the recombined fractions was mostly in the range of 1-5 μm. The diameter d1 of the MCC fibres was less than 100 nm and the aspect ratio of the fibres was larger than 10.

Two model food compositions according to the invention, a tomato soup and a white velouté sauce where produced according to the process of the invention.

A dispersion containing 1 wt % surface-active particles (ethyl cellulose) and 1 wt % MCC fibre particles in water was prepared (step a) as follows: 1 g ethyl cellulose ("EC", 100 cps, ethoxy content 48%, Aldrich) powder was dissolved in 100 ml acetone at 30° C. in a 500 ml beaker. An equal volume of deionised water was quickly added into the EC solution under strong stirring to precipitate the EC into particles. The acetone was removed with a rotary evaporator and water was added to set the final volume to 100 ml. The volume weighted mean diameter of the EC particles was 120 nm. It was measured using dynamic light scattering.

1 g dry MCC powder prepared as described above was added into the EC dispersion. The MCC-EC dispersion was stirred for 10 minutes, sonicated for 10 minutes and stirred for another 10 minutes. The MCC material consisted of hydrophilic fibre particles. The EC particles were moderately hydrophobic.

The dispersion was whipped using a kitchen mixer (Kenwood) operating at full speed for 5 minutes (step b). In this step the volume was increased from 100 ml to 800 ml. The foam concentrates due to liquid drainage, so that the air content becomes close to 100%, say 99%. The size of the gas bubbles, expressed as a volume weighted diameter and determined from analysis of microscopic images, was about 90 μm.

The foam was mixed into a conventional tomato soup or a conventional white velouté sauce (both bought from the local shops as ready-to-use products) such that the air content became 50 vol %, as follows:
40 ml of the foam (3 g) will contain about 0.05 g of surface active particles and about 0.05 g of fibre particles. 20 ml of the tomato soup was mixed with 20 ml of a 0.5 wt % solution of xanthan gum in water at ambient temperature. The xanthan solution serves to prevent foam drainage. Similarly, 20 ml of the velouté sauce was mixed with 20 ml of the 0.5 wt % aqueous xanthan solution at ambient temperature. Then, 40 ml of the foam was set to a total volume of 80 ml by adding 40 ml of liquid, comprising half soup or sauce and half xanthan solution. If so desired, the food composition can then be packed (step c).

Fat Contents:
In case of the sauce, the fat content in the final composition was 6.5 wt %. In the case of the soup, the fat content was probably less than 1 wt % (only traces of oil, originating from the tomato).

Water Contents:
The water content was 95 wt % in the final soup composition. It was 89 wt % in the final sauce product.

Accordingly the combined amount of fat and water in the soup product was about 95-96 wt %. The combined amount of fat and water in the sauce product was also about 95-96 wt %. In both products the amount of gas was about 50 vol %.

The resulting aerated sauce and soup products were stored in glass bottles and stored for 2 hours and for five days at temperatures of 20° C., 60° C. and 90° C.

The experiment showed that both the aerated soup and the aerated sauce were stable at 90° C. for a short time. At 20-60° C., the products were stable for at least one day. At 20° C. the products were stable for more than 2 weeks.

For comparison, it was tried to prepare foams using dispersions containing only the MCC particles or only the EC particles, instead of the dispersion containing both MCC particles and EC particles. However, with these dispersions no stable foams were obtained and the experiment was not pursued further.

Example 2

An aerated fruit smoothie was prepared by gently mixing 10 ml foam produced by MCC-EC dispersion (see example 1) into 10 ml of liquid. The liquid consisted for one half of Knorr Vie® juice (strawberry+carrot+apple, ex Unilever, Netherlands) and for the other half of a 0.5 wt % solution of xanthan gum in water, which was added to prevent liquid drainage from the foam. The mixing resulted in a prototype with a final gas content of about 50 vol % and a final xanthan concentration of 0.25 wt %. The aerated smoothie was stable and no disproportionation occurred for at least 3 weeks at ambient and chilled conditions. A microscopic image of the aerated fruit smoothie is shown in FIG. 2 below.

The prototype product contained about 91 wt % water, 0.3 wt % fat, 0.4 wt % protein and 7 wt % carbohydrates. The combined amount of water and fat was about 92 wt %. This type of product could be packed in a plastic or carton container with lid, as is commonly used e.g. for milk, coffee or other drinks.

For comparison, a foam was prepared using a 2 wt % aqueous solution of *Quillaja* saponin. *Quillaja* saponin is a natural saponin emulsifier obtained from the *Quillaja* tree and is available from Natural Response in Chili. The foam was prepared by mixing with the Kenwood mixer in the same way as described in example 1. The overrun of the resulting foam was comparable to that of the MCC-EC foam of example 1. The foam was mixed with the mixture of the fruit smoothie and xanthan solution in the same way as done for the MCC-EC based foam to obtain again a product with about 50 vol % gas. The resulting product was not very stable. After 1 week it had lost most of its gas content.

A further comparison was done with a foam made from a solution of 2 wt % milk protein in water. Whipping with the Kenwood mixer as described in example 1 only provided an overrun of about 250%. The foam was mixed in the same manner as described above with the fruit smoothie and xanthan solution to provide a gas content in the product of about 50 vol %. The product was not stable; it had largely lost its gas content after 1 day storage.

Example 3

An aerated coffee creamer was prepared in the same way as the aerated fruit smoothie described in example 2. Becel® coffee creamer (Unilever, Netherlands) was used in stead of the Knorr Vie juice. The Becel® coffee creamer contained 78 wt % water, 4 wt % vegetable oil, 7 wt % milk protein and 11 wt % milk sugar. The resulting prototype product had a gas content of about 50 vol %. It was stable against disproportionation for at least 3 weeks at ambient and chilled conditions.

The prototype product contained about 89 wt % water, 2 wt % fat, 3.5 wt % protein and 6 wt % carbohydrates. Accordingly the combined amount of water and fat was 91 wt %. This type of product could be packed in a plastic container with sealed lid, as is commonly used e.g. for dairy cream or the like.

Example 4

An aerated drinkable meal was prepared in the same way as the aerated fruit smoothie described in example 2. Slim.Fast® milk shake (raspberry flavour, Unilever UK) was used instead of the Knorr Vie juice. The Slim.Fast® milk shake contained 85 wt % water, 2.0 wt % fat, 4.3 wt % protein and 7.7 wt % carbohydrates. The resulting prototype product had a gas content of about 50 vol %. It was stable and no disproportionation occurred for at least 3 weeks at ambient and chilled conditions.

The prototype product contained about 92 wt % water, 1.0 wt % fat, 2.2 wt % protein and 4.1 wt % carbohydrates. Accordingly the combined amount of water and fat was about 93 wt %. This type of product could be packed in a plastic bottle with cap or in a can or the like.

Example 5

An aerated mayonnaise was prepared in the same way as the aerated fruit smoothie described in example 2. Conventional mayonnaise was used in stead of the Knorr Vie juice. The resulting prototype product had a gas content of about 50 vol %. The foamed product was stable for at least 3 weeks at ambient and chilled conditions.

The prototype product contained about 61 wt % water, 37 wt % fat, 0.6 wt % protein and 2.2 wt % carbohydrates. The combined amount of water and fat was about 97 wt %. This type of product could e.g. be packed in a plastic or glass jar with cap.

For comparison, foams were prepared from a 2 wt % aqueous *Quillaja* saponin solution and from a 2 wt % aqueous milk protein solution as described in example 2. Each of these foams was mixed with the mixture of mayonnaise and xanthan solution in an attempt to make a product with a gas content of about 50 vol %. However, in both cases the foams collapsed during the mixing, loosing much of their gas straight away. We believe that this relates both to the high oil content of mayonnaise and its high viscosity. Nevertheless, a stable product with a high gas content could readily be prepared with the MCC-EC foam as described above.

Example 6

An aerated salad dressing was prepared in the same way as the aerated fruit smoothie described in example 2. Calvé® salad dressing (Unilever, Netherlands) was used in stead of the Knorr Vie juice. The salad dressing contained 70 wt % water, 21 wt % fat, 1 wt % protein and 7 wt % carbohydrates. The resulting prototype product had a gas content of about 50 vol %. It was stable and no disproportionation occurred for at least 3 weeks at ambient and chilled conditions.

The product contained about 85 wt % water, 10 wt % fat, 0.5 wt % protein and 4 wt % carbohydrates. The combined amount of water and fat was about 96 wt %. This type of product could e.g. be packed in a plastic or glass jar or bottle with cap.

Example 7

An aerated mushroom soup was prepared in the same way as the aerated fruit smoothie described in example 2. Cup-a-Soup® creamy mushroom soup (Unilever, Netherlands) was used in stead of the Knorr Vie juice. The soup was allowed to cool down to ambient temperature before it was mixed with the foam. The aerated mushroom soup (overrun 100%) was stable against disproportionation for at least 3 weeks at ambient and chilled conditions.

The prototype product contained about 95 wt % water, 1 wt % fat, 0.4 wt % protein and 3 wt % carbohydrates. Accordingly the combined amount of water and fat was about 96 wt %. This type of product could e.g. be packed in a plastic jar or pouch.

For comparison, foams were prepared from a 2 wt % aqueous *Quillaja* saponin solution and from a 2 wt % aqueous milk protein solution as described in example 2. Each of these foams was mixed with the mixture of mushroom soup and xanthan solution in an attempt to make a product with a gas content of about 50 vol %. However, in both cases the foams collapsed during the mixing, loosing much of their gas straight away.

Example 8

An aerated tomato ketchup was prepared in the same way as the aerated fruit smoothie described in example 2. Conventional tomato ketchup was used in stead of the Knorr Vie juice. The resulting prototype product had a gas content of about 50 vol %. It was stable against disproportionation for at least 3 weeks at ambient and chilled conditions.

The prototype product contained about 85 wt % water, 0.1 wt % fat, 1 wt % protein and 13 wt % carbohydrates. Accordingly the combined amount of water and fat was about 85 wt %. This type of product could e.g. be packed in a jar or bottle.

For comparison, foams were prepared from a 2 wt % aqueous *Quillaja* saponin solution and from a 2 wt % aqueous milk protein solution as described in example 2. Each of these foams was mixed with the mixture of tomato ketchup and xanthan solution to obtain a product with a gas content of about 50 vol %. The stability of these foams was less than 1 day for both samples.

Example 9

A cup of hot coffee with milk and sugar was taken from a vending machine. The volume was about 100 ml. It contained about 93 wt % water, 2.3 wt % milk protein, 1.3 wt % fat and 3.7 wt % carbohydrate. It was topped with appr. 10 ml of MCC-EC foam prepared as described in example 1. The amount of MCC fibre particles and of EC surface active particles in the foamed coffee is estimated to have been about 0.01 wt % and 0.01 wt %, respectively. The gas bubbles rose to the top of the cup and formed a foam layer. A plastic spoon was placed vertically in the middle of the foam top and the moment that the spoon tilts against the edge of the cup was defined as the lifetime of the foam. The lifetime of the MCC-EC-foam was more than one day.

For comparison, a cup of cappuccino was taken from a vending machine and a plastic spoon was placed in the middle of the foam top. The lifetime of the foam was 2 minutes.

Example 10

An aerated pasta sauce was prepared in the same way as the aerated fruit smoothie described in example 2. Bertolli Mild Pastasauce® (Unilever, Netherlands) was used in stead of the Knorr Vie juice. The resulting prototype product had a gas content of about 50 vol %. It was stable against disproportionation for at least 3 weeks at ambient and chilled conditions.

The prototype product contained about 87 wt % water, 0.1 wt % fat, 2 wt % protein and 7.7 wt % carbohydrates. Accordingly the combined amount of water and fat was about 88 wt %. This type of product could e.g. be packed in a pouch, jar or bottle.

Example 11

$CaCO_3$ rods (Qinghai Haixing Science & Technology Co., Ltd. China) were modified with oleoyl chloride to adjust their wettability from highly hydrophilic to intermediately hydrophobic. $CaCO_3$ rods were dried in 160° C. oven for 4 hours to remove adsorbed water. Acetone was dried with 4 A molecular sieve desiccant. 10 ml oleoyl chloride (85%, Aldrich) was diluted with 90 ml dried acetone to get 10% (V/V) oleoyl chloride solution. 5.0 g $CaCO_3$ rods was dispersed into 100 ml dried acetone. After 10 minutes sonication, 3.0 ml oleoyl chloride solution was added under stirring. 1 hour later, the dispersion was filtrated and washed three times with ethanol (re-dispersing filter cake into 30 ml ethanol, stirring for 5 minutes). After washing, the filter cake was dispersed in 30 ml ethanol, and then 120 ml water was added to the dispersion under strong stirring. Half an hour later, the dispersion was filtrated and washed three times with water (re-dispersing the cake into 60 ml water, stirring for 10 minutes). After washing and filtration, the filter cake was weighed and water was added to obtain a 25 wt % $CaCO_3$ slurry.

Small particles of $CaCO_3$ (SOCAL S1V ex Solvay, Angera, Italy) were functionalized to be surface active particles with oleoyl chloride in a similar manner as the CaCO3-rods. The concentration of the particle slurry was set to 30 wt %. 9.6 g of slurry containing small $CaCO_3$ particles and 7.6 g of slurry containing modified $CaCO_3$-fibres were dispersed in water to a total mass of 100 g. The weight ratio of fibres particles and surface active particles was about 2:3. This dispersion was stirred for 10 minutes and then whipped for 5 minutes in a Kenwood mixer operating at full power to reach a total volume of 450 ml.

An aerated milkshake was prepared by mixing 10 ml of Slim.Fast® milk shake (chocolate taste, Unilever, UK) with 10 ml of the foam described above, yielding a gas content of about 50 vol %. Upon standing, the gas bubbles moved to the top forming a foam layer. The aerated milk shake was stable and no disproportionation occurred for at least 5 days.

The product contained about 84 wt % water, 1.6 wt % fat, 4.6 wt % protein and 8.0 wt % carbohydrates. Accordingly the combined amount of water and fat was about 86 wt %. This type of product could e.g. be packed in a plastic or glass jar with cap.

Example 12

A 1 wt % EC-dispersion (150 ml) was prepared in the same manner as described in example 1 except that the ethyl cellulose was from another source ("EC", EC-N100 0100 ex Hercules, Wilmington, Del., USA). Also for this material, the volume weighted mean diameter of the EC particles was 120 nm as measured using dynamic light scattering.

1.5 g dry MCC powder prepared as described in example 1 was added to the EC dispersion and mixed and then whipped as described in example 1. In the last step the volume increased from 150 ml to 900 ml. The foam concentrated due to liquid drainage so that the air content became close to 100 vol %, estimated at about 99 vol %.

Aerated mayonnaise products were prepared by mixing a conventional mayonnaise with the foam in 3 different ratios. The resulting prototype products had a gas content of about 24, 36 and 50 vol %. No creaming of the gas bubbles occurred. The products remained stable for a week.

The products contained about 22 wt % water, 73 wt % fat, 1.1 wt % protein and 3.9 wt % carbohydrates. Accordingly the combined amount of water and fat was about 95 wt %. This type of product could e.g. be packed in a plastic or glass jar with cap.

Example 13

An aerated fresh cheese spread was prepared in a similar manner as the aerated mayonnaise described in example 12. Conventional fresh cheese spread was used in stead of the mayonnaise and a different amount of foam was used. The resulting product had a gas content of about 40 vol %. Creaming and disproportionation of the gas bubbles did not occur for at least one week.

The product contained about 69 wt % water, 17 wt % fat, 11 wt % protein and 3.0 wt % carbohydrates. Accordingly the combined amount of water and fat was about 86 wt %. This type of product could e.g. be packed in a plastic tub closed with a lid and optionally including a sealed cover leaf.

Example 14

0.15 g of bacterial MCC microfibres (EX9560 ex CP Kelco, Surrey, U.K.) was added to 150 ml of an EC-dispersion as described in example 12. Tartaric acid was added until the pH of the dispersion was 3.0. The MCC-EC dispersion was stirred for 10 minutes, sonicated for 10 minutes and stirred for another 10 minutes. The MCC material consisted of hydrophilic fibre particles. The EC particles were moderately hydrophobic. The dispersion was whipped using a kitchen mixer (Kenwood) operating at full speed for 5 minutes. In this step the volume was increased from 150 ml to 900 ml. The foam concentrated due to liquid drainage so that the air content became about 99 vol %.

An aerated mayonnaise was prepared by mixing the same mayonnaise as used in example 12 with this foam. The resulting product had a gas content of about 50 vol %. The aerated product was stable for at least one week against creaming and collapse.

The water, fat, protein and carbohydrate contents of the product were about the same as in example 12.

Example 15

The experiment of example 9 was repeated except that instead of the MCC-EC foam of example 1, the MCC-EC foam described in example 14 was used. The same results were obtained as with the foam of example 1.

Example 16

Commercial Citrus Fibres (Herbacel AQ, ex Herbafood, Werder Germany) were dispersed in water at a concentration of 2 wt %. This dispersion was homogenised at a pressure of 400 bar. This material was freeze dried. 0.15 g of homogenised and freeze dried citrus fibres was added to 150 ml of an EC-dispersion as described in example 12. Tartaric acid was added until the pH of the dispersion was 3.0. The dispersion was stirred for 10 minutes, sonicated for 10 minutes and stirred for another 10 minutes. The citrus fibre material consisted of hydrophilic fibre particles. The EC particles were moderately hydrophobic. The dispersion was whipped using a kitchen mixer (Kenwood) operating at full speed for 5 minutes (step b). In this step the volume was increased from 150 ml to 900 ml. The foam concentrated and the air content became about 99 vol %.

An aerated mayonnaise product was prepared by mixing 20 ml of this foam with 20 ml of conventional Calvé Mayonnaise (Unilever, Netherlands) that had been diluted 1:1 with an aqueous solution of 0.05 wt % xanthan gum and 0.05 wt % locust bean gum. The resulting prototype product had a gas content of about 50 vol %. The aerated product was stable for at least one week.

The prototype product contained about 61 wt % water, 37 wt % fat, 0.6 wt % protein and 2.0 wt % carbohydrates. The combined amount of water and fat was about 97 wt %. This type of product could e.g. be packed in a plastic or glass jar with cap.

Example 17

An aerated drinkable meal was prepared by mixing 10 ml of Slim.Fast® milk shake (raspberry flavour, Unilever UK) with 10 ml of the foam described in example 16, resulting in a gas content of appr. 50 vol %. The bubbles rose to the top and formed a foam layer. The product was stable and no disproportionation occurred for at least 5 days.

The product contained about 85 wt % water, 2.0 wt % fat, 4.3 wt % protein and 7.7 wt % carbohydrates. Accordingly the combined amount of water and fat was about 87 wt %. This type of product could e.g. be packed in a plastic container or cup with a cap or in a tin can.

Example 18

Aerated cooking creams were prepared by mixing Blue Band Finesse® (Unilever, Netherlands) with the foam described in example 16 in different ratios, resulting in gas contents of about 25 vol % and 50 vol %. The gas bubbles rose to the surface and formed a foam layer. The products are intended to be shaken before use. After 5 days a little creaming had happened but no noticeable disproportionation or collapse of the foam.

The products contained about 79 wt % water, 15 wt % fat, 1.9 wt % protein and 4.2 wt % carbohydrates. Accordingly the combined amount of water and fat was about 94 wt %. This type of product could e.g. be packed in a plastic tub with a sealed cover leaf and a lid or in a glass jar with a cap.

The invention claimed is:

1. A process to prepare a food composition, the food composition comprising gas bubbles and, based on the food composition;
    at least 10 wt. % of water,
    optionally fat, wherein the amount of fat and water taken together is at least 60 wt. % and less than 99 wt. %,
    at least 1 vol. % and less than 70 vol. % of gas,
    fibre particles having an insoluble particulate structure, a length of 0.1 to 100 microns and aspect ratio more than 10,
    surface active particles having a volume weighted mean diameter is at least 0.1 µm and less than 10 µm and selected from the group consisting of water insoluble methyl cellulose, and ethyl cellulose,
wherein 2 times the volume weighted mean diameter of the surface active particles (d2) is smaller than the length of the fibre particles (L) and wherein the fibre particles are present together with the surface active particles at the air-water interface and attract each other and wherein the gas bubbles are stable against disproportionation for at least 3 weeks at ambient and chilled conditions, the process comprising the steps of:
    a. incorporating in a liquid food composition
        surface active particles
        fibre particles
    b. incorporating gas in said liquid food composition
    c. packing the food composition, and
wherein any fat, protein and thickening agent to be included in the food composition, is included after step b and before step c.

2. The process according to claim 1, wherein the fibre particles are made of carbohydrates.

* * * * *